US010265817B2

(12) United States Patent
Sanders

(10) Patent No.: US 10,265,817 B2
(45) Date of Patent: Apr. 23, 2019

(54) TURBINE DRIVEN POWER UNIT FOR A CUTTING TOOL

(71) Applicant: Gerald Jay Sanders, Houston, TX (US)

(72) Inventor: Gerald Jay Sanders, Houston, TX (US)

(73) Assignee: SFI Alpha Spin Ltd. (IL)

( * ) Notice: Subject to any disclaimer, the term of this patent is extended or adjusted under 35 U.S.C. 154(b) by 744 days.

(21) Appl. No.: 14/773,194

(22) PCT Filed: Mar. 6, 2014

(86) PCT No.: PCT/US2014/021409
§ 371 (c)(1),
(2) Date: Sep. 4, 2015

(87) PCT Pub. No.: WO2014/138481
PCT Pub. Date: Sep. 12, 2014

(65) Prior Publication Data
US 2016/0008937 A1    Jan. 14, 2016

Related U.S. Application Data

(60) Provisional application No. 61/820,074, filed on May 6, 2013, provisional application No. 61/773,734, filed on Mar. 6, 2013.

(51) Int. Cl.
*B23Q 5/06* (2006.01)
*F01D 15/06* (2006.01)

(52) U.S. Cl.
CPC .............. *B23Q 5/06* (2013.01); *F01D 15/06* (2013.01)

(58) Field of Classification Search
CPC ....... F01D 15/06; F01D 15/062; F01D 15/065; F01D 25/16; B23Q 5/06
USPC ..................... 415/903, 904, 208.1; 29/889.2
See application file for complete search history.

(56) References Cited

U.S. PATENT DOCUMENTS

| | | | |
|---|---|---|---|
| 3,074,167 A | 1/1963 | Turchi et al. | |
| 3,639,074 A | 2/1972 | Killick | |
| 3,946,490 A * | 3/1976 | Sotman | A61C 1/05 184/6.14 |
| 4,020,556 A * | 5/1977 | Sotman | A61C 1/088 433/133 |
| 4,021,918 A * | 5/1977 | Bailey | A61C 1/141 433/127 |
| 4,219,330 A * | 8/1980 | Jaremus | A61C 1/05 433/126 |
| 4,229,139 A | 10/1980 | Marantette et al. | |
| 7,192,248 B2 | 3/2007 | Helvey et al. | |
| 8,276,273 B2 | 10/2012 | Shigemoto et al. | |

FOREIGN PATENT DOCUMENTS

| | | |
|---|---|---|
| CN | 101611218 | 12/2009 |
| CN | 201874727 | 6/2011 |
| DE | 1626261 B | 10/1970 |
| DE | 19541526 A1 | 5/1996 |
| JP | S52-078183 | 7/1977 |
| JP | S59-148255 | 10/1984 |
| JP | S60259379 A | 12/1985 |
| JP | H02-104961 | 8/1990 |
| JP | H08-141865 | 6/1996 |
| JP | H09-057573 | 3/1997 |
| JP | 2007-537051 | 12/2007 |
| WO | WO 2011/001421 | 1/2011 |

OTHER PUBLICATIONS

International Search Report for PCT application No. PCT/US2014/021409; dated May 16, 2014.
English Abstract of DE19541526; www.espacenet.com; retrieved on Sep. 4, 2015.
English Abstract of JP560259379; www.espacenet.com; retrieved on Sep. 4, 2015.
Machine generated English translation of the First Office Action and Search Report, from the State Intellectual Property Office of People's Republic of China, dated Jan. 22, 2017, 10 pages, for the corresponding Chinese Patent Application No. 201480025550.7.
Communication pursuant to Article 94(3) EPC, from the European Patent Office, dated Feb. 14, 2017, 5 pages, for the corresponding European Patent Application No. 14713698.0.
English translation of the Examination Report, from the Taiwan Patent Office, dated Dec. 26, 2017, 6 pages, for the corresponding Taiwan Patent Application No. 103107601.
Machine generated English translation of the Second Office Action, from the State Intellectual Property Office of People's Republic of China, dated Jan. 3, 2018, 8 pages, for the corresponding Chinese Patent Application No. 201480025550.7.
Machine generated English translation of the Notification of Reasons for Refusal, from the Japan Patent Office, dated Mar. 13, 2018, 8 pages, for the corresponding Japanese Patent Application No. 2015-561681.
Communication pursuant to Article 94(3) EPC, from the European Patent Office, mailed on Mar. 19, 2018, 3 pages, for the corresponding European Patent Application No. 14713698.0.
Machine generated English translation for CN 101611218, listed as item # 3 above, Patent Translate by EPO and Goggle, retrieved Jul. 24, 2018, 17 pages.

(Continued)

*Primary Examiner* — Mark Laurenzi
*Assistant Examiner* — Mickey France
(74) *Attorney, Agent, or Firm* — Polsinelli PC

(57) ABSTRACT

A turbine power unit for a power tool having a turbine housing with an interior space configured to receive therein a fluid powered turbine supported for rotation on a bearing within the turbine housing. A service opening through the turbine housing into the interior space thereof, the service opening configured to permit installation and removal of a bearing into and out of the interior space of the turbine housing. A removable cover releasably securable to the turbine housing over the service opening and transitionable between an open configuration in which a bearing can be installed into and removed from the interior space of the turbine housing through the service opening and a closed configuration in which an installed bearing within the interior space is secured for operation in the turbine housing.

20 Claims, 17 Drawing Sheets

(56) References Cited

OTHER PUBLICATIONS

Machine generated English translation for CN 201874727, listed as item # 4 above, Patent Translate by EPO and Goggle, retrieved Jul. 24, 2018, 5 pages.
Machine generated English translation for JP S52-078183, listed as item # 5 above, Japan Platform for Patent Information, retrieved Apr. 23, 2018, 4 pages.
Machine generated English translation for JP S59-148255, listed as item # 6 above, Japan Platform for Patent Information, retrieved Jul. 24, 2018, 9 pages.
Machine generated English translation for JP H02-104961, listed as item # 7 above, Japan Platform for Patent Information, retrieved Jul. 24, 2018, 4 pages.
Machine generated English translation for JP H08-141865, listed as item # 8 above, Patent Translate by EPO and Goggle, retrieved Jul. 24, 2018, 11 pages.
Machine generated English translation for JP H09-057573, listed as item # 9 above, Patent Translate by EPO and Goggle, retrieved Jul. 24, 2018, 16 pages.
Machine generated English translation for JP 2007-537051, listed as item # 10 above, Patent Translate by EPO and Goggle, retrieved Jul. 24, 2018, 10 pages.
Communication pursuant to Article 94(3) from the European Patent Office, dated Dec. 6, 2018, 5 pages, for the corresponding European Patent Application No. 14713698.
Machine generated English translation for DE 1626261 B, Espacenet, retrieved Jan. 3, 2019, 8 pages.

* cited by examiner

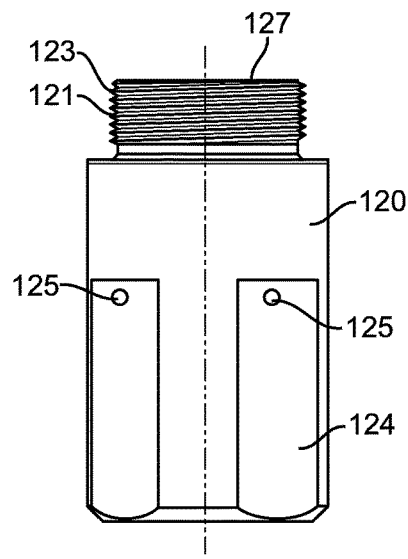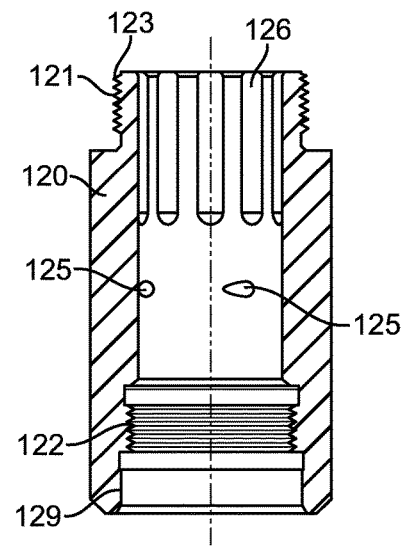
FIG. 4A  FIG. 4B
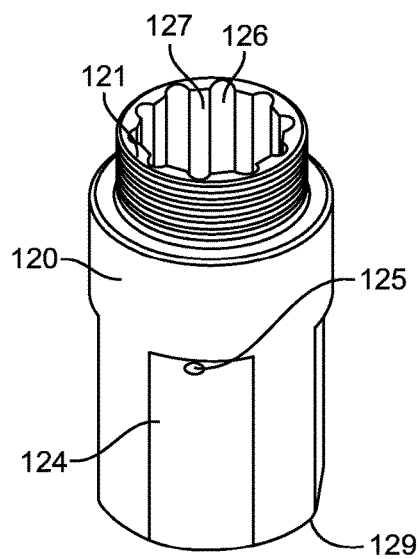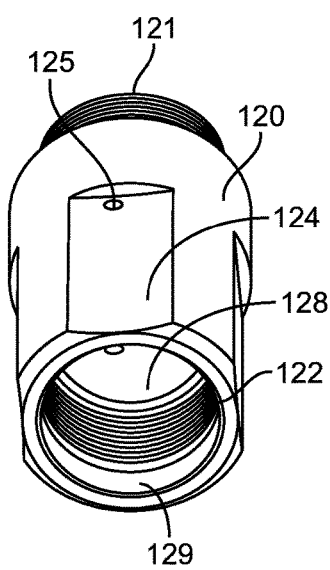
FIG. 4C  FIG. 4D

TURBINE DRIVEN POWER UNIT FOR A CUTTING TOOL

CROSS REFERENCE TO RELATED APPLICATIONS

This application is a national stage entry of PCT Application No. PCT/US2014/021409 filed on Mar. 6, 2014, which claims the benefit of U.S. Provisional Pat. App. No. 61/773,734, filed on Mar. 6, 2013, and U.S. Provisional Pat. App. 61/820,074, filed May 6, 2013; the contents of each application are hereby incorporated by reference in their entireties.

FIELD

The present disclosure relates to rotary cutting tools for performing various rotary machining operations. More particularly, to turbine driven cutting tools supported by ball bearings. The turbine driven cutting tool can integrate ultrasonic abilities.

BACKGROUND

Machine tools such as lathes, milling machines or drill heads that are used in manufacturing to mechanically remove material from a work-piece normally operated at a relatively low speed and high output power. In some cases, a work-piece being machined by such machine tools may require additional machining by other types of tool that are suitable for example for performing more accurate machining using small diameter tools. This additional machining may require additional setup and machining time.

Spindles provide for increased production, and improved overall efficiency of machining devices. However, known spindles may be very complex and often constructed from very expensive components such as advanced bearing assembly and motors. Hence, spindles tend to be very expensive, which limit their usage to only very high production quantities and high cutting qualities. An alternative solution is spindle speeders (also referred to as spindle speed increasers or multipliers). These devices may be assembled on the machining devices and rotate together with the main spindle of the machine devices. Thus, the overall rotation speed of the assembly may be the algebraic sum of the rotation speed of the spindle speeders and the rotation speed of the main spindle of the machining device.

Turbine driven rotor machine tools that operate at relative higher speeds may be suitable for performing for example the above mentioned accurate machining. These tools typically have a spindle that is supported for rotation by accurate and often expensive bearings and a replaceable machining bit that is detachable secured to the spindle. U.S. Pat. No. 7,192,248 and International Patent Publication WO 2011/001421 A1 describe a turbine driven rotary cutting tool that has support for attaching the turbine cutting tool to a conventional machine tool holder. The turbine cutting tool has a spindle which is supported by bearings and the spindle is provided with a tool holder that is adapted to grip a cutting bit.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 4A is an elevational view of an exemplary turbine housing, according to the present disclosure.

FIG. 4B is a cross-section illustration of the exemplary turbine housing of FIG. 4A.

FIG. 4C is an isometric view of the exemplary turbine housing of FIG. 4A.

FIG. 4D is an isometric view from a different angle of the exemplary turbine housing of FIG. 4A.

DETAILED DESCRIPTION

Figure 1A:
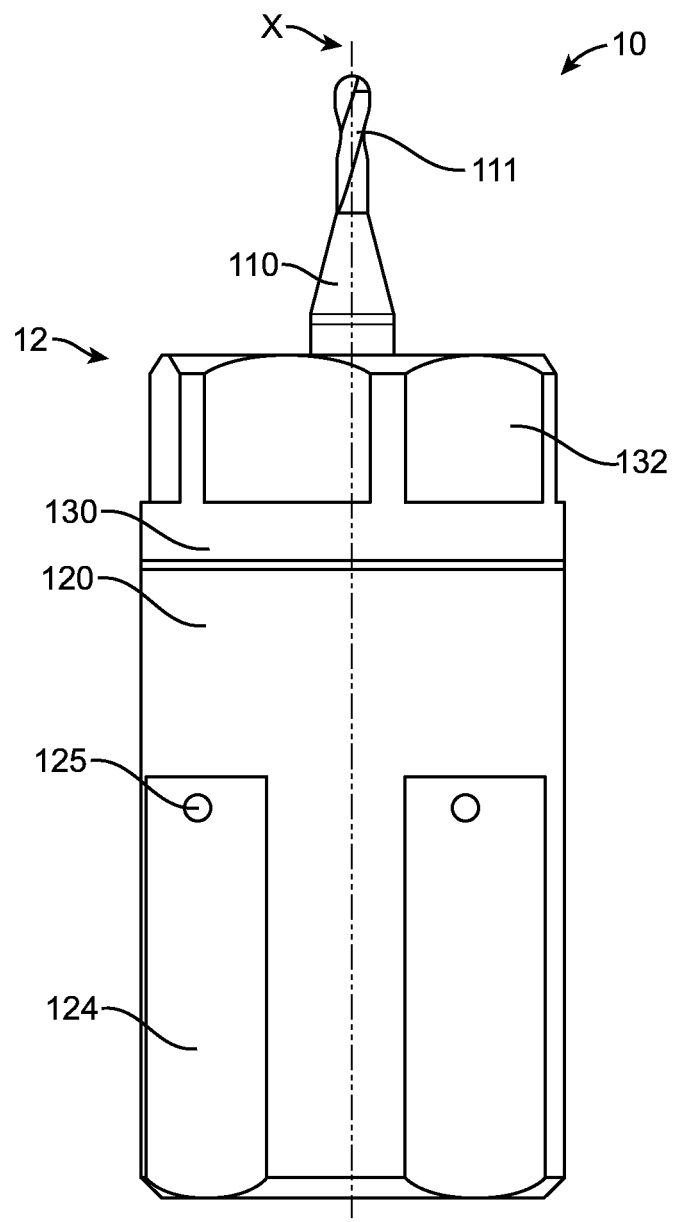
FIG. 1A is an elevational view of an exemplary power unit, according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "above," "below," "longitudinal," "lateral," and the like, as used herein, shall mean in relation to the bottom or furthest extent of, the power unit even though the power unit or portions of it may be deviated or horizontal. Correspondingly, the transverse, axial, lateral, longitudinal, radial, etc., orientations shall mean orientations relative to the orientation of the power unit.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

A power unit is disclosed having a turbine and at least one replaceable bearing. In at least one embodiment, the turbine can be coupled to a shaft which is supported by the bearing. For example, a portion of the shaft can be within the bearing. In at least one embodiment, the bearing can be a ball bearing based bearing or a roller bearing. The bearing can have an inner race and an outer race. The inner race can be configured to contact or almost contact the shaft. In at least one embodiment, the shaft can be a shank of a cutting tool. In one example, the cutting tool can be a drill bit, a mill, or other device designed to cut, drill, or machine a surface. The shaft can have a longitudinal centerline and is rotatably supported in a turbine housing by the at least one bearing. In at least one embodiment, two or more bearings can be implemented. While most of the details presented herein feature two bearings, a single bearing can be implemented or more than two bearings can be implemented.

The turbine housing can be generally cylindrical and have a longitudinal centerline. The longitudinal centerlines of the shaft and turbine housing can be substantially aligned.

The power unit assembly can include a shaft, a turbine, a bearing, and a turbine housing. The turbine housing can include at least one service opening. Additionally, a preload spring can be provided. The preload spring can provide a biasing force to position the internal contents of the housing in the appropriate positions.

The turbine housing can have at least one removable cover releasably securable over the service opening. In at least one example, the turbine housing can be configured to have at least two removable covers releasably securable over two respective service openings, each being formed at an end of the turbine housing. The shaft can be rotatably supported in the turbine housing by at least one bearing. The shaft can be rotatable within the turbine housing around the longitudinal axis. The shaft can be a rotating tool shank. The turbine can be a close fit on the rotating shaft such that the turbine is able to slide on the rotating shaft. For example a clearance of 0.01 inch to 0.001 inch can be possible. In other embodiments where the measurements are in metric the clearance can be 0.1 mm to 0.01 mm. In yet other embodiments, the fit between the turbine and the shaft can be such that it requires a press fit. In other embodiments, the turbine can be attached to the shaft by heat, glue, or welding. The turbine can be coupled to the shaft such that the shaft and the turbine rotate in substantial unison. For example, when the turbine is caused to spin, the shaft spins in unison with turbine. In at least one example, the turbine and the shaft can be coupled such that they have the same rotational speed. In other embodiments, a gearing can be provided such that the shaft and the turbine rotate at different rotational speeds.

The present disclosure can be implemented with a single bearing or with two or more bearings. The number of bearings and spacing can be configured to reduce wear or provide for simplicity in design. In an embodiment in which two bearings are provided, the bearings can be arranged on both sides (top and bottom) of the turbine with a very small clearance to allow relatively easy assembly and disassembly of the bearings. For example, a washer or other spacer can be provided to separate the turbine from the bearing.

Additionally, the fit between the shaft and the bearings can be a close fit. For example, a clearance of 0.01 inch to 0.001 inch can be possible. In other embodiments where the measurements are in metric the clearance can be 0.1 mm to 0.01 mm. In at least one embodiment, the fit between the shaft and bearing is such that it is not as close of a fit as the fit between the turbine and the shaft.

The turbine housing can include a one or more through openings orinlet jets, on the side wall outer surface for inletting a driving medium (for example, a driving fluid, lubricant, water, oil, emulsion, air, or a combination of one or more of these) towards the turbine. The driving medium can be any fluid or gas that is configured to cause the turbine to rotate. Additionally, the turbine housing can include one or more outlets that allow for the driving medium to exit the housing. The driving fluid can be based on the material that is being cut, the design of the power unit, or the desired speed of the tool.

The location of the inlet for the driving fluid can be chosen based upon what type of input source is used with the power unit. Additionally, the exit can be based on the type of fluid and the type of material that is to be cut. In the cutting of some materials, no fluid should contact the material and thus the exits are located to prevent the fluid from contacting the material being cut. In other examples, it is required to have fluid contact the material to provide cooling and/or cleaning of the material.

In at least one embodiment, the exit of the driving fluid can be through the cover. As indicated above, the cover can include one or more through openings for expelling the driving medium after passing through the turbine and directed toward the material being cut, thus providing additional cooling. The one or more through holes can be alternatively located on the sidewalls of the cover, expelling the driving medium out the side. Side expulsion of the driving medium can be useful when the driving fluid should not impact the material being cut. In at least one embodiment, the driving fluid used when a side exit is provided can be air. In other embodiments, the air can be mixed with oil, emulsion, and/or water. In at least one embodiment, the emulsion can be an oil and water mixture. In another embodiment, the emulsion can be an air and oil mixture. In yet another embodiment, the emulsion can be an oil, water, and air mixture.

The power unit can be lubricated using the driving fluid. In at least one example, the driving fluid can be an emulsion, which can save money and eliminate a damaging mixture of oils within the machine. The emulsion can be used at a pressure between 5-80 BAR. The power unit can alternatively be dry air lubricated with emulsion. The rotational speed of the turbine and the tool coupled thereto can be based on the pressure. For example, when the driving fluid is air, the rotation speeds follow the following formula (in case of 13 mm turbine diameter):

$V[Krpm]=P[bar]*30+40.$

For emulsion (13 mm turbine): $V[Krpm]=18\times\ln(P[bar])$:

The cover can have a plurality of engagement surfaces on the sidewall. The turbine housing can further include a plurality of engagement surfaces on the sidewall. These engagement surfaces can be substantially flat. The engagement surfaces can take other forms to provide allow for positive engagement with a servicing tool. The cover can have an inner diameter that is at least partially threaded. The turbine housing can have an outer diameter that is at least partially threaded and capable of releasably engaging with the at least partially threaded inner diameter of the cover. The turbine housing have also have an inner diameter that is at least partially threaded opposite the end has an outer diameter that is at least partially threaded. An additionally cover can have an outer diameter that is at least partially threaded and capable of releasably engaging with the at least partially threaded inner diameter of the turbine housing. The additional cover can be configured to be substantially flush with the second end of the turbine housing when in a closed configuration. In the closed configuration, the additional cover can be slightly recessed from the second end of the turbine housing. The additional cover can further include a plurality of depressions in formed therein for receiving a coupling tool to remove and install the additional cover. The coupling tool can include a plurality of prongs located thereon capable of engaging the plurality of depressions.

Figure 1B:
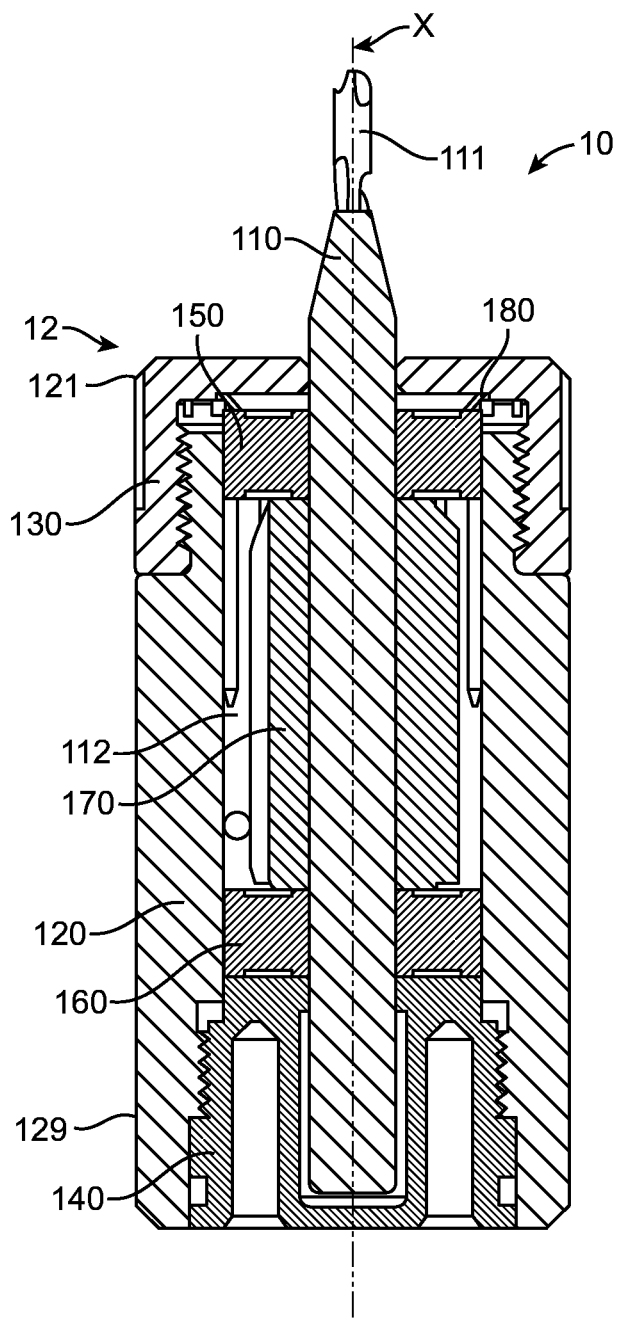
FIG. 1B is a cross-section illustration of the exemplary power unit of FIG. 1A.
Figure 1C:
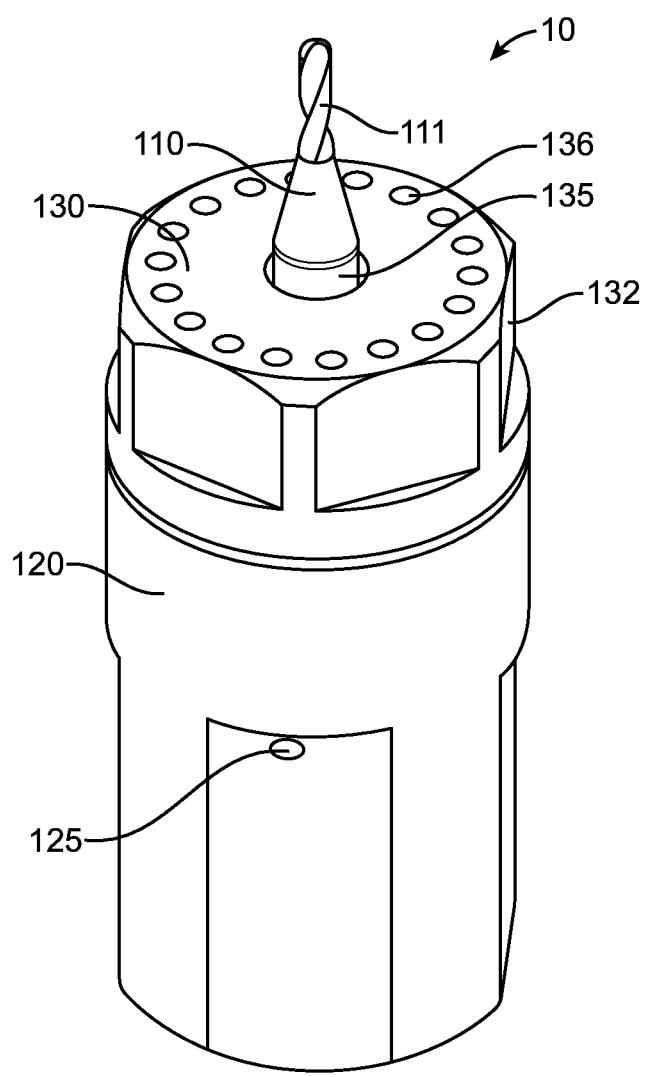
FIG. 1C is an isometric view of the exemplary power unit of FIG. 1A.

FIGS. 1A, 1B, and 1C of the drawings illustrate power unit 10, in a closed configuration 12, comprising a shaft 110, a turbine housing 120, a cover 130, and an additional cover 140. In the closed configuration 12, the power unit 10 can be configured to be used. As illustrated, the turbine housing 120 has an interior space 112 that is configured to contain components of the power unit 10. As illustrated in FIG. 1B, the first bearing 150, the turbine 170, and a second bearing 160 are located within the interior space 112. The interior space can house other components as well.

As shown, the shaft 110 can include a cutting tip 111. As illustrated, the cutting tip 111 is a drill. In other embodiments, the cutting tip 111 can take the form of other shapes and configurations so as to remove material as desired. In at least one embodiment, the cutting tip 111 can be integrally formed with the shaft 110 such that the shaft 110 can be described as the shank of the cutting tool. In other embodiments, the cutting tip 111 can be releasably engaged with the shaft 110. The shaft 110 can be at least partially contained within the turbine housing 120, and rotatably supported by the turbine housing 120 along longitudinal axis X. The shaft 110 can be coupled to a first bearing 150, a turbine 170, and a second bearing 160.

The cover 130 can be configured for removable engagement with the turbine housing 120 at a first end 121. The additional cover 140 can be configured for removable engagement with the turbine housing at a second end 129. The cover 130 can also include a preload spring 180. The preload spring 180 can be used to bias the bearings 150, 160 into the proper position. In other embodiments, the preload spring 180 can be separate from the cover 130. The turbine housing 120 can include one or more through openings 125 located on a sidewall. The one or more through openings 125 can be configured to provide for an entrance for the driving fluid.

The turbine housing 120 can further include a plurality of engagement surfaces 124 located on the sidewall. The one or more engagement surfaces 124 can be configured to assist in the removal and installation of the cover 130 and additional cover 140 from the turbine housing 120. In at least one embodiment, one or more engagement surfaces 124 can be substantially flat to provide a surface that can be easily gripped with a tool. Additionally, in at least one embodiment, the one or more engagement surfaces 124 can be a plurality of engagement surfaces.

The one or more through openings 125 can be located on the plurality of engagement surfaces 124, or can be located elsewhere on the turbine housing 120 sidewall. The one or more through openings 125 can receive a driving medium, such as oil, water, driving fluid, or a combination thereof. The one or more through openings 125 can receive the driving medium and channel it towards the turbine 170. In at least one embodiment, the one or more through openings 125 can be a plurality of through openings 125. The location of the one or more through openings 125 can be based upon the machine that the power unit 10 is configured to cooperate with. Specifically, the one or more through openings 125 can be aligned with a source of the driving medium.

Figure 2A:
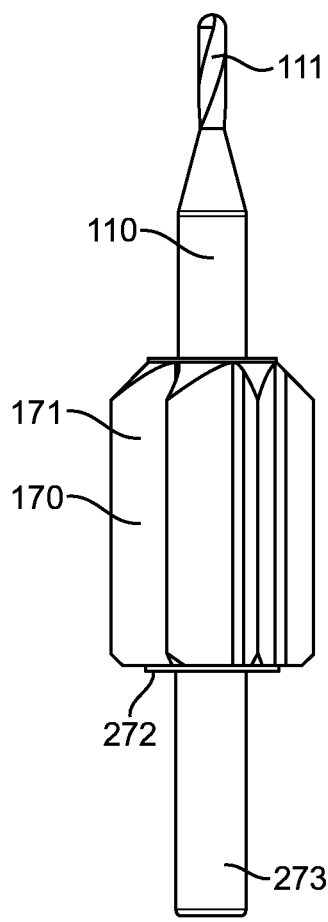
FIG. 2A is an elevational view of an exemplary spindle and turbine system, according to the present disclosure.
Figure 2B:
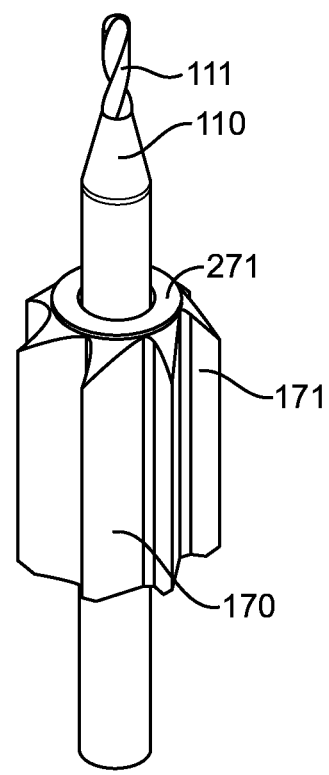
FIG. 2B is an isometric view of the exemplary spindle system of FIG. 2A.

FIGS. 2A and 2B illustrate the shaft 110. The shaft 110 as described above can be a shank of a cutting tool. The shaft 110 can have a turbine 170 installed thereon. The turbine 170 can be inserted integrally by heat shrink, glue, or press fit. In other embodiments, the turbine 170 can be integrally formed on the shaft 110. The turbine 170 can comprise one or more vanes 171. In at least one embodiment, the one or more vanes can comprise a plurality of vanes. The one or more vanes can have a configuration that is based on one or more of the shape of the housing, the desired speed, and the driving medium being used.

The power unit can further include a first washer 271 and a second washer 272. The first washer 271 and second washer 272 can provide a buffer between the turbine 170 and the one or more bearings. The shaft 110 can have two ends, a cutting tip 111, and a second end 273 located opposite the cutting tip 111.

Figure 3A:
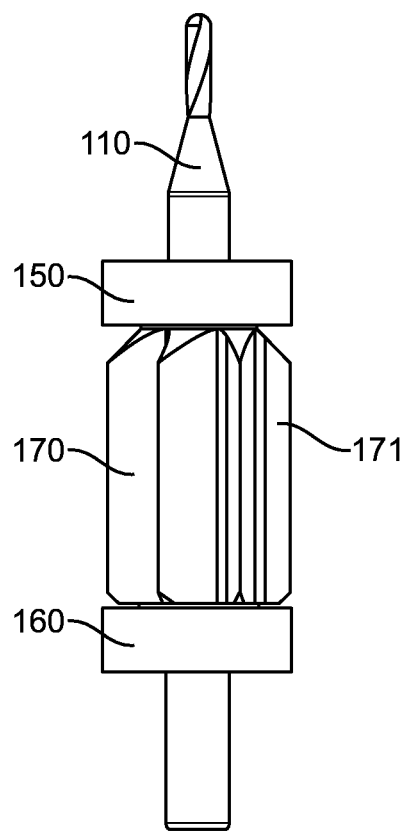
FIG. 3A is an elevational view of an exemplary spindle including turbine and bearings system, according to the present disclosure.
Figure 3B:
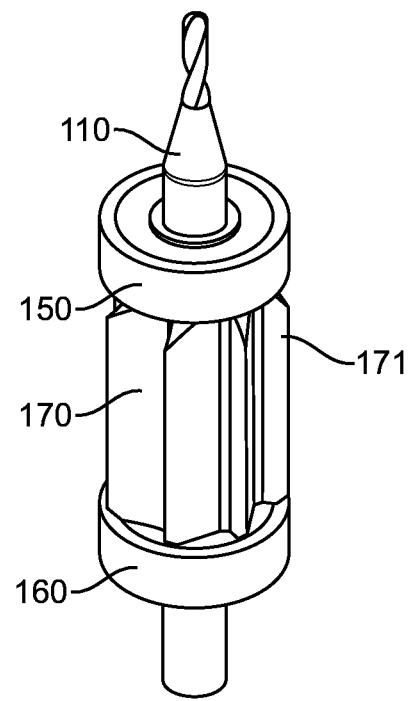
FIG. 3B is an isometric view of the exemplary spindle system of FIG. 3A.

FIGS. 3A and 3B of the drawings illustrate the complete shaft assembly. The shaft 110 can have a first bearing 150, a turbine 170, and a second bearing 160 installed thereon. The bearings 150, 160 can be located on either side of the turbine 170 with a very small clearance to allow relatively easy assembly and disassembly of the bearings 150, 160. In at least one embodiment, the clearance between the bearings 150, 160 and the turbine 170 can be on the order of a few microns. In other examples, the bearings 150, 160 can be such that the turbine 170 touches a rotary portion of the bearings 150, 160 that rotate with the turbine. The rotation of the turbine 170 can be caused as the driving medium causes the fins 171 of the turbine 170 to rotate about the axis. While two bearings 150, 160 are illustrated, the present disclosure can be implemented with a single bearing 150.

FIGS. 4A, 4B, 4C and 4D of the drawings illustrate the turbine housing 120. The turbine housing 120 can include a first end 121 with an outer diameter that is at least partially threaded 123. The first end 121 can have an external diameter configured for releasable engagement with the cover. The first end 121 can also include special channels 126 for exhausting the driving medium after exiting the turbine. The turbine housing 120 can further include a second end 129 with an inner diameter that is at least partially threaded 122. The at least partially threaded second end 122 can have an inner diameter configured for releasable engagement with the additional cover.

In the open configuration as illustrated in FIGS. 4A, 4B, 4C and 4D, the housing 120 forms a service opening 127 at the first end 121. Also, the housing 120 forms an additional service opening 128 at the second end 129. In at least one embodiment, the housing 120 can only have a service opening at one of the first end 121 or the second end 129. As illustrated, the through opening 125 for the driving medium can have a substantially circular shape on the exterior of the housing 120 and a tear drop shape on the interior of the housing 120. In other embodiments, the shape of the through opening 125 can be determined to provide the desired flow characteristics based on the speed of the turbine and the location of the injection ports for the driving medium. As illustrated the through opening 125 can be located on the engagement surfaces, but in other embodiments the through opening 125 can be located on other positions.

Figure 5A:
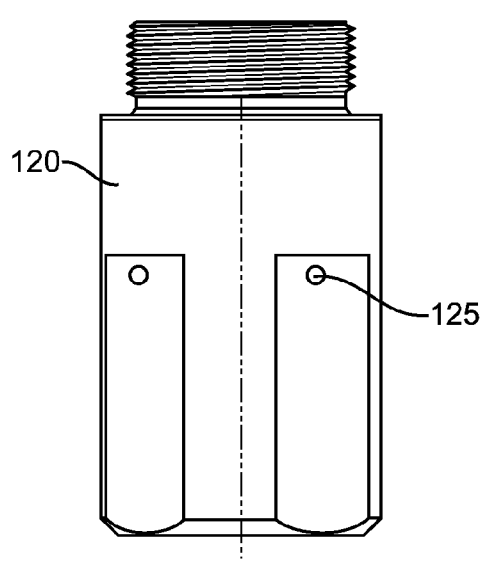
FIG. 5A is an elevational view of an exemplary turbine housing, according to the present disclosure.
Figure 5B:
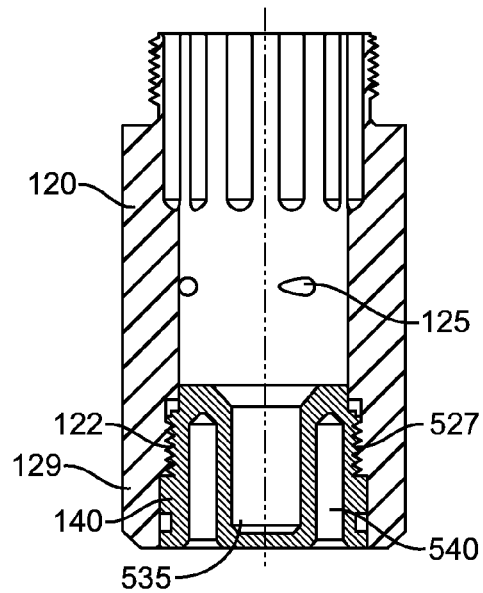
FIG. 5B is a cross-section illustration of the exemplary turbine housing of FIG. 5A.
Figure 5C:
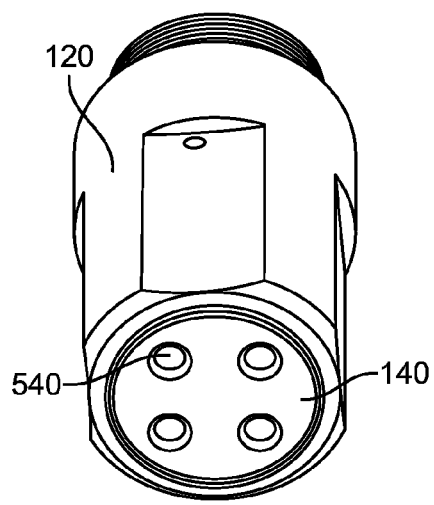
FIG. 5C is an isometric view of the exemplary turbine housing of FIG. 5A.

FIGS. 5A, 5B and 5C illustrate the turbine housing 120 having the additional cover 140 releasably engaged in an installed configuration. The turbine housing 120 can have a second end 129 with an inner diameter that is at least partially threaded 122 configured for removable engagement with the additional cover 140. The additional cover 140 can have an outer diameter that is at least partially threaded 527. The at least partially threaded inner diameter 422 configured for removable engagement with the at least partially threaded outer diameter 527. The additional cover 140 is configured to be substantially flush with the second end of the turbine housing in an installed configuration. The additional cover 140 can also include one or more depressions 540 formed on the exterior facing surface for receiving a coupling tool to install and remove the additional cover 140 to the turbine housing 120. As illustrated, a plurality of depressions 540 is provided. The number of depressions 540 can be such that it prevents the removal tool from slipping and also provides for the desired force characteristics. The additional cover 140 can further include a shaft receiving portion 535 formed on an interior of the additional cover 140. The shaft receiving portion 535 can be configured to receive the second end of the shaft. In at least one embodiment, the shaft receiving portion 535 can be configured to act as a bearing surface when only a single bearing is provided.

Figure 6A:
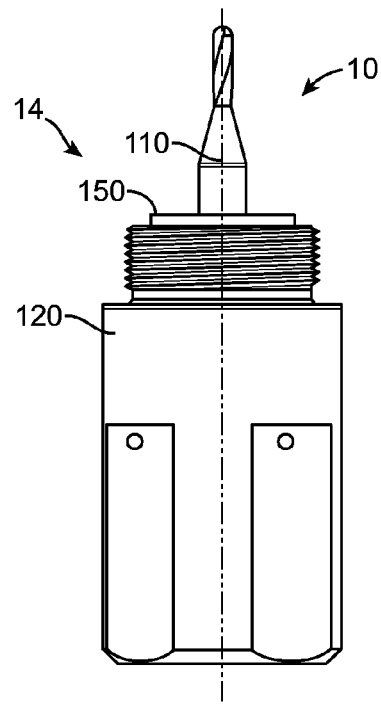
FIG. 6A is an elevational view of an exemplary turbine housing, according to the present disclosure.
Figure 6B:
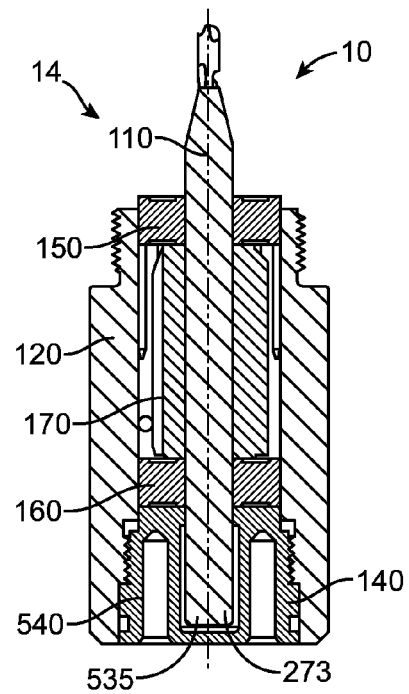
FIG. 6B is a cross-section illustration of the exemplary system of FIG. 6A.
Figure 6C:
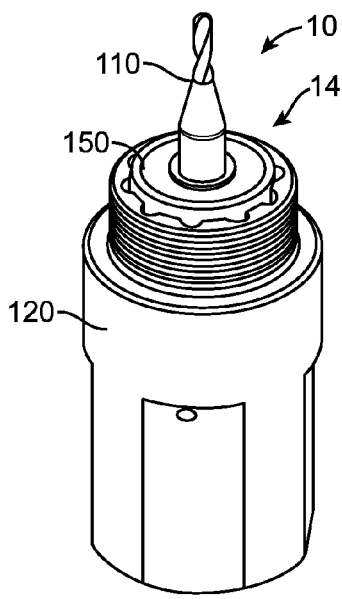
FIG. 6C is an isometric view of the exemplary system of FIG. 6A.

FIGS. 6A, 6B, and 6C illustrate the additional cover 140, shaft 110, turbine 170, and bearings 150, 160 installed within the turbine housing 120 in an open arrangement 14 such that one or more of the components can be installed or removed from the housing 120. The shaft 110 can have the second end 273 received into the shaft receiving portion 535. The second bearing 160 can be installed on the shaft 110 just above the installed additional cover 140. In at least one embodiment, a portion of the second bearing 160 can contact the installed additional cover 140. The shaft 110 can have a turbine 170 installed above the second bearing 160, and have a first bearing 150 installed above the turbine 170. The shaft 110 can be arranged such that the first bearing 150 extends at least partially above the first end of the turbine housing 120. While an additional cover 140 is illustrated, the present disclosure can instead be implemented with a fixed bottom portion so that the components described above are only inserted through the service opening at the first end of the housing.

Figure 7A:
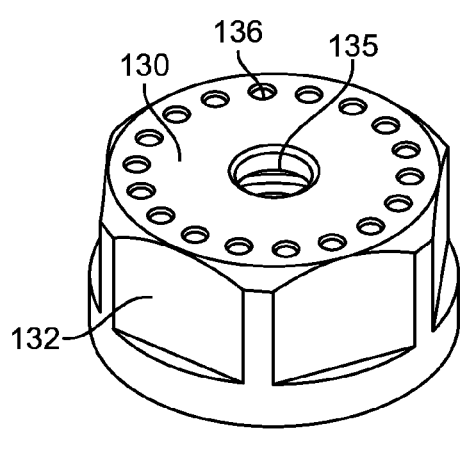
FIG. 7A is an isometric of an exemplary cover for turbine housing of FIG. 1A, according to the present disclosure.
Figure 7B:
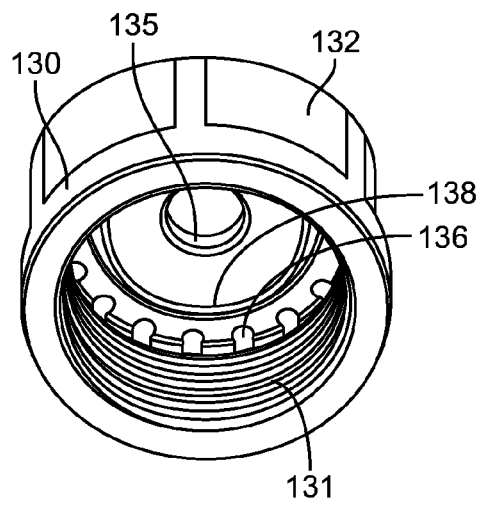
FIG. 7B is an isometric view from a different angle of the cover of FIG. 7A.

FIGS. 7A and 7B illustrate the cover 130 of the power unit. The cover 130 can have an inner diameter at least partially threaded 131 configured for releasable engagement with the at least partially threaded outer diameter of the first end of the turbine housing. The cover 130 can also have one or more through openings 136 formed on a surface thereof. The one or more through openings 136 allow for the driving medium to exit from the turbine housing when the cover 130 is in a closed configuration. The driving medium can enter through the plurality of through openings located on the sidewall of the housing, passing through the turbine and special channels, and exit through the one or more through openings 136 arranged on the cover. The driving medium can be expelled through the one or more through openings 136 and directed to the work surface for extra cooling. As illustrated the one or more openings 136 comprises a plurality of through openings 136. The plurality of through openings 136 are evenly spaced around an interior circumference of the top face of the cover 136. The location of the plurality of through openings 136 can be configured to provide the desired cooling and removal function. In other embodiments as indicated earlier, the through openings 136 can be located on different positions on the cover 130 or housing 120.

The cover 130 can further include a shaft aperture 135 configured for the shaft to extend through when the cover is in an installed configuration. The cover can further have a one or more engagement surfaces 132. The one or more engagement surfaces 132 can assist in removing and installing the cover to the turbine housing. The one or more engagement surfaces 132 can be substantially flat and configured to engage with a coupling tool. Other configurations of the engagement surfaces are within the scope of this disclosure. As illustrated, the one or more engagement surfaces 132 comprise a plurality of engagement surfaces.

Figure 8A:
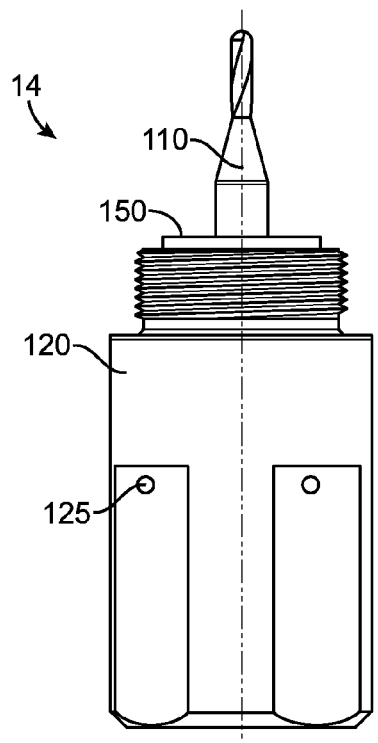
FIG. 8A is an elevational view of an exemplary power unit turbine housing including spindle and bearings, according to the present disclosure.
Figure 8B:
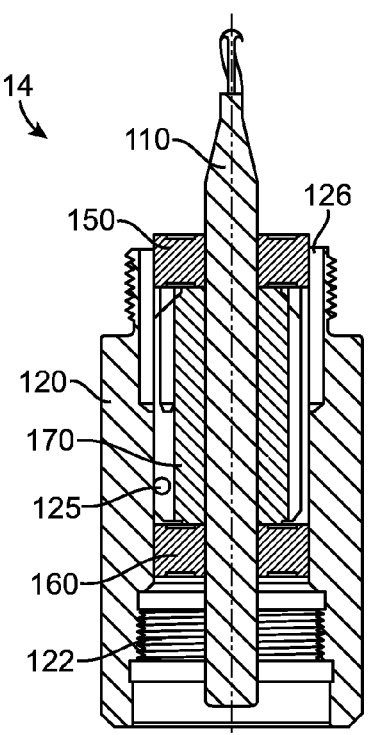
FIG. 8B is a cross-section illustration of the exemplary power unit of FIG. 8A.
Figure 8C:
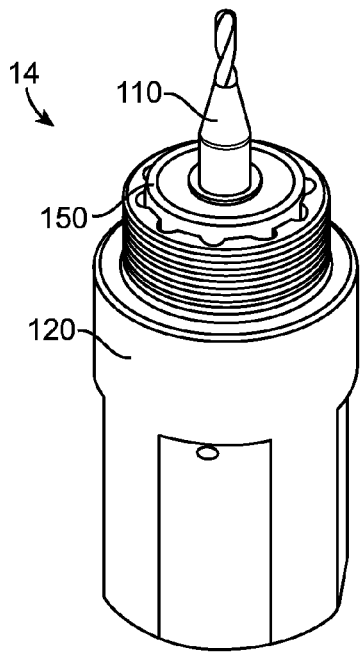
FIG. 8C is an isometric view of the exemplary power unit of FIG. 8A.
Figure 8D:
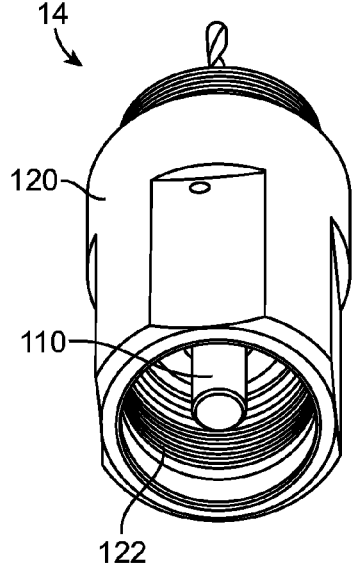
FIG. 8D is an isometric view from a different angle of the exemplary power unit.

FIGS. 8A, 8B, 8C, and 8D illustrate the turbine housing 120 with the shaft 110, first bearing 150, turbine 170, and second bearing 160 in an open configuration. FIG. 8A illustrates the first bearing 150 can extend at least partially above the at least partially threaded first end of the housing 120. FIG. 8B shows that the plurality of through openings 125 can be arranged to direct the driving medium toward the turbine 170, and the driving medium then exits the turbine through the special channels 126 before being exhausted through the plurality of through openings located on the cover. As illustrated neither the cover nor the additional cover is coupled to the housing 120. In this configuration, the components can be inserted into the housing through either the service opening or the additional service opening. In other embodiments, a portion of the components can be installed through the service opening and another portion installed through the additional service opening. When two service openings are provided, it allows for the components that closest to that service opening to be replaced without removing other components that do not need replacing.

Figure 9A:
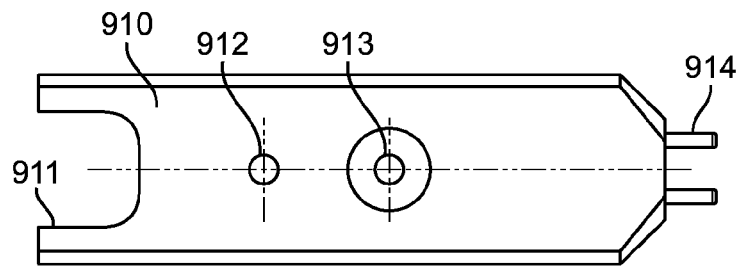
FIG. 9A is an elevational view of an exemplary coupling tool, according to the present disclosure.
Figure 9B:
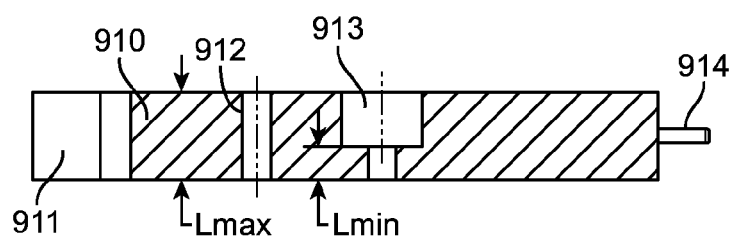
FIG. 9B is a cross-section illustration of the exemplary coupling tool of FIG. 9A.
Figure 9C:
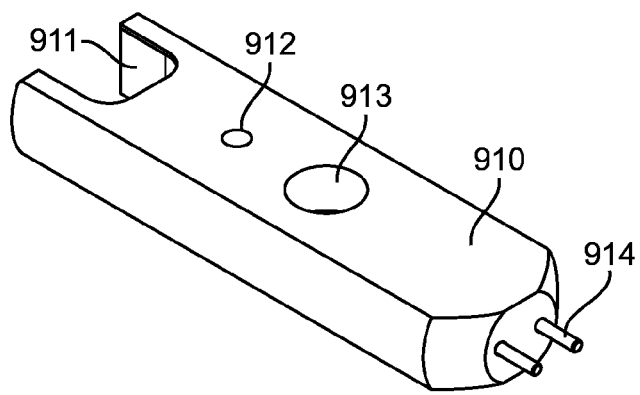
FIG. 9C is an isometric view of the exemplary coupling tool of FIG. 9A.

FIGS. 9A, 9B, and 9C illustrate an exemplary shaft assembly device, or coupling tool. The coupling tool 910 can have a receiving element 911 configured to couple with the one or more engagement surfaces on the cover and turbine housing. The receiving element 911 can help remove and install the cover and additional cover to the turbine housing. The coupling tool 910 can also include a plurality of prongs 914 configured to be received in the plurality of depressions formed on the additional cover. The plurality of prongs 914 can be removably engaged with the plurality of depressions and can help remove and install the additional cover. The coupling tool can also have a through opening 912 of a single bore diameter, which can be slightly larger to the shaft diameter, but less than the turbine diameter, throughout the depth of the coupling tool 910. The depth of coupling tool 910 can correspond to the maximum length of the shaft between the turbine and the second end. The coupling tool 910 can have a second through opening 913 that can have at least two different diameters. The first diameter can correspond to the diameter of the turbine, and the second diameter can correspond to the diameter of the shaft. The bore length of the second diameter can be the minimum length acceptable between the turbine and the second end.

FIGS. 10A, 10B, 10C, 10D and 10E illustrate the installation of the turbine 170 on the shaft 110 wherein the shaft length after the turbine 170 corresponds to the maximum acceptable length. As illustrated, the turbine 170 includes a plurality of vanes 171.

Figures 10A, 10B, 10C:
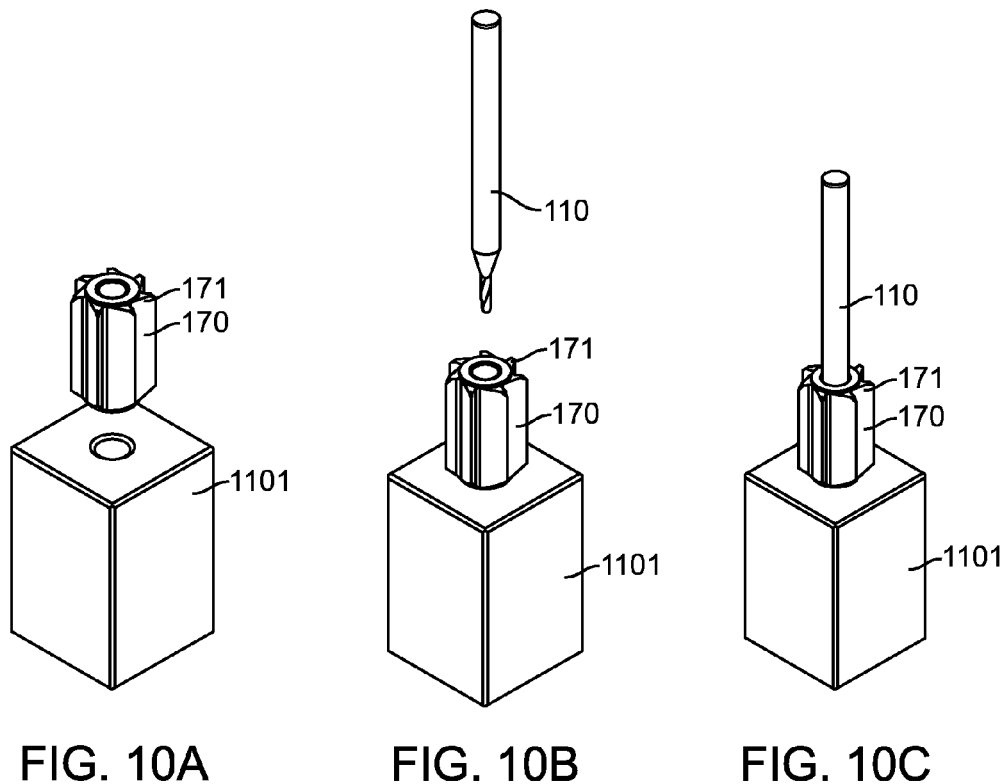
FIG. 10A is an isometric view of the exemplary coupling of the spindle to the turbine, according to the present disclosure.
FIG. 10B is an isometric view of the exemplary coupling of the spindle to the turbine.
FIG. 10C is an isometric view of the exemplary coupling of the spindle to the turbine.
Figure 10D:
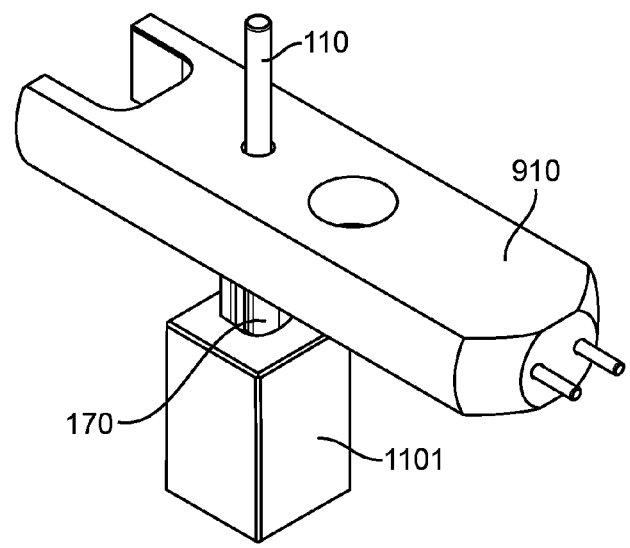
FIG. 10D is an isometric view of the exemplary coupling of the spindle to the turbine.
Figure 10E:
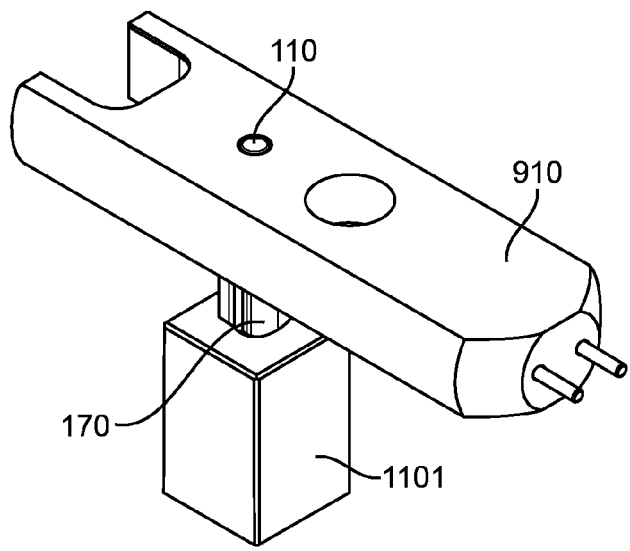
FIG. 10E is an isometric view of the exemplary coupling of the spindle to the turbine.
Figure 10F:
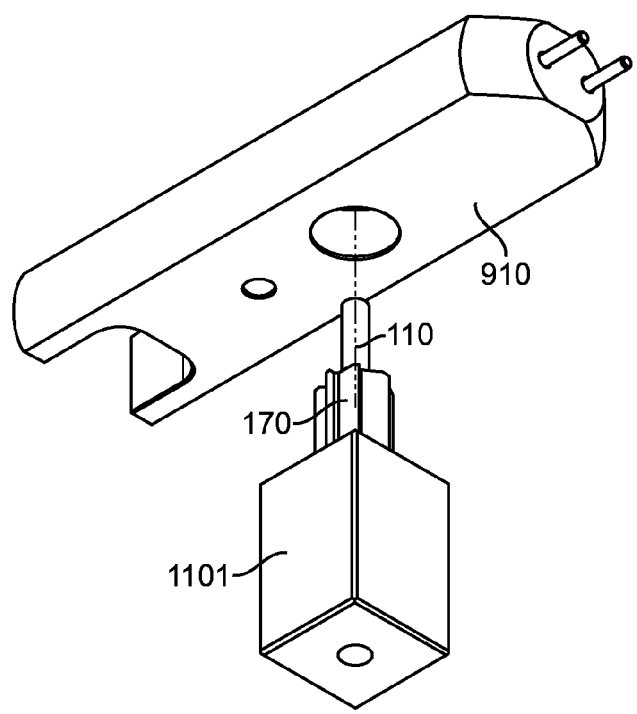
FIG. 10F is an isometric view of the exemplary coupling of the spindle to the turbine.
Figure 10G:
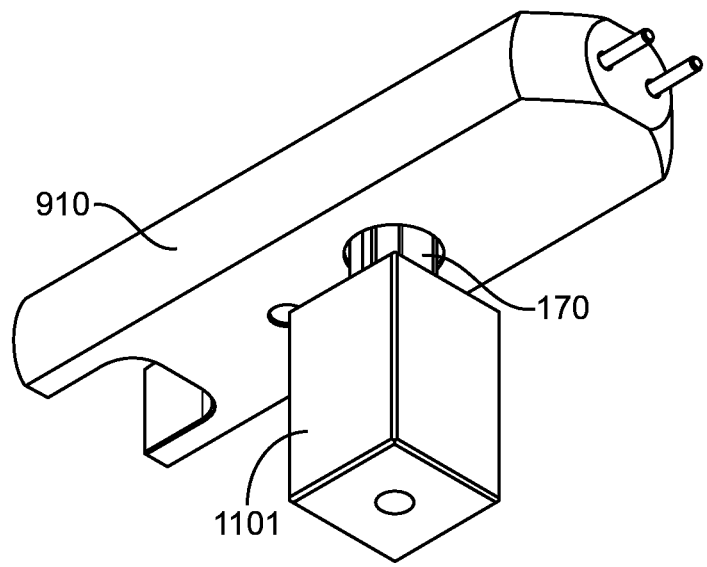
FIG. 10G is an isometric view of the exemplary coupling of the spindle to the turbine, according to the present disclosure.
Figure 10H:
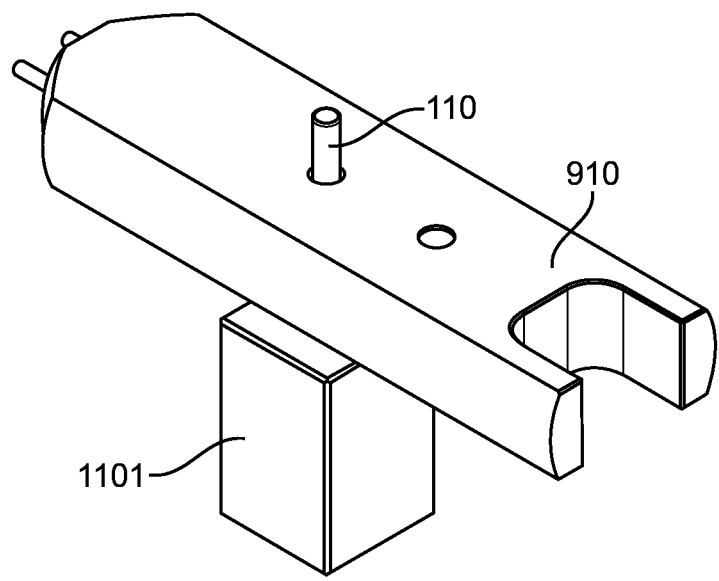
FIG. 10H is an isometric view of the exemplary coupling of the spindle to the turbine.
Figure 10I:
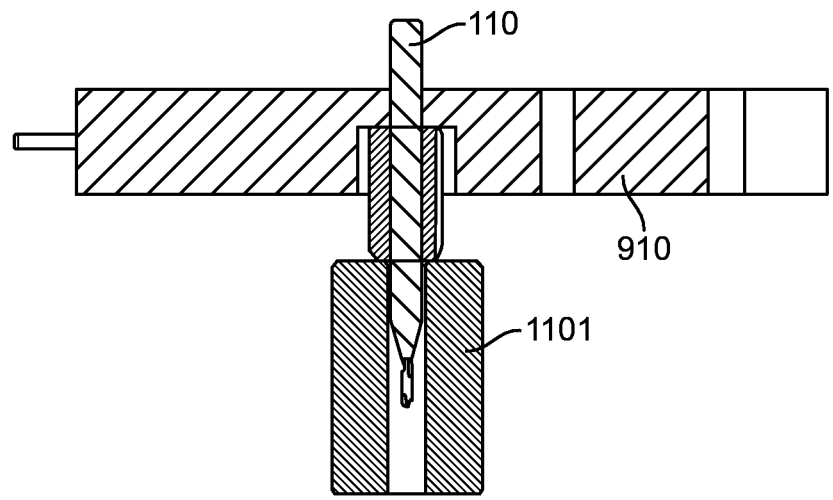
FIG. 10I is cross-sectional view of the exemplary of the spindle to the turbine.

As shown in FIG. 10A, the turbine 170 can be placed on installation block 1101 with the first end of the turbine touching the surface of installation block 1101. The shaft 110 can then be inserted into turbine 170 in with the cutting end entering the turbine first, as shown in FIGS. 10B and 10C. As seen in FIG. 10D, the coupling tool 910 can then be placed over the assembly with the shaft 110 being inserted through the through hole with a single bore diameter. FIG. 10D illustrates the shaft 110 can then be pressed into the turbine 170 until the second end of the shaft is flush with surface of the coupling tool 910. The coupling tool 910 can then be removed from the assembly, revealing the maximum acceptable length of the shaft between the turbine and the second end.

Figure 10J:
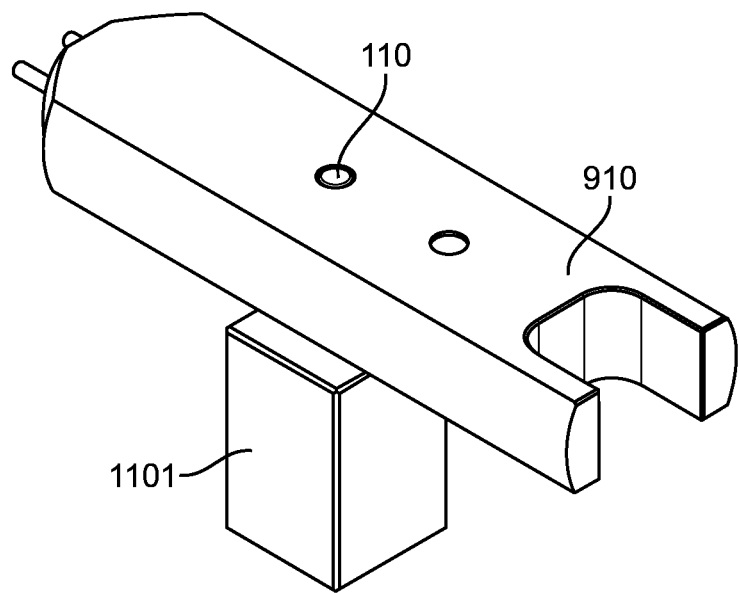
FIG. 10J is an isometric view of the exemplary coupling procedure.

FIGS. 10F, 10G, 10H, 10I, and 10J illustrate the installation of the turbine 170 on the shaft 110 wherein the shaft length after the turbine corresponds to the minimum acceptable length. The shaft assembly can be inserted into the coupling tool 910 through the through hole having two different bore diameters. The second end of the shaft can be inserted first through the through hole with a larger bore diameter. The turbine 170 can then be recessed inside the first bore diameter, exposing a portion of the shaft on the opposite side of the coupling tool. The turbine 170 can be bounded on a first end by the installation block 1101 and by the coupling tool 910 on a second end. The second end of the turbine can be position at the end of the first bore diameter of the through hole with two bore diameters. FIG. 10J illustrates the shaft 110 can then be pressed into the turbine 170 until the second end of the shaft is flush with surface of the coupling tool 910. The coupling tool 910 can then be removed from the assembly, revealing the minimum acceptable length of the shaft between the turbine and the second end.

While FIGS. 10A-J illustrate the installation of the turbine 170 on the shaft, the present disclosure contemplates that the turbine 170 could be affixed to the shaft 110 using other methods. Additionally, the turbine 170 can be welded or otherwise attached to the shaft 110.

Figure 11A:
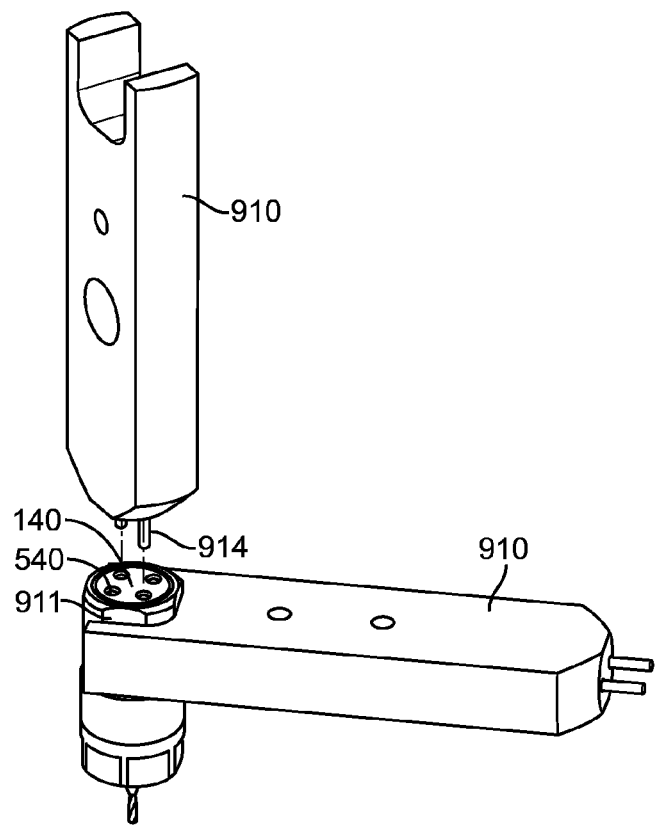
FIG. 11A is an isometric view of the exemplary decoupling of a bottom closure cover from the housing, according to the present disclosure.
Figure 11B:
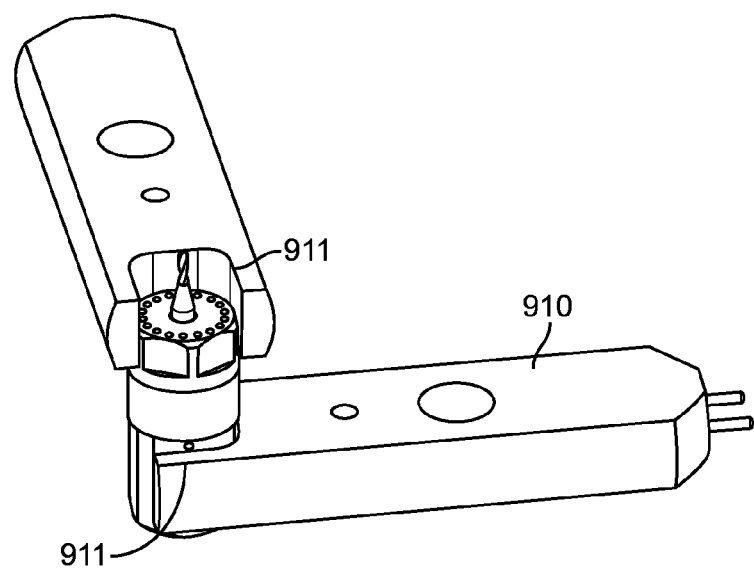
FIG. 11B is an isometric view of the exemplary decoupling of a cover from the housing, according to the present disclosure.

FIGS. 11A and 11B illustrate the installation and removal of the cover and additional cover using the coupling tool. FIG. 11A illustrates the coupling tool can be help remove the additional cover 140 using the plurality of prongs 914. The plurality of prongs 914 can be removably engaged with the plurality of depressions 540 formed on the additional cover 140. Once engaged, the coupling tool can help remove the additional cover 140 via a rotational motion relative to the longitudinal axis releasing the at least partially threaded inner diameter of the turbine housing and at least partially threaded outer diameter of the additional cover 140. The coupling tool can also help installation of the additional cover 140 by removably engaging the plurality of prongs 914 with the plurality of depressions formed on the additional cover 140 and applying an opposite rotational motion relative to the longitudinal axis. FIG. 11B illustrates the coupling tool can help remove the cover using the plurality of engagement surfaces located on the cover and the plurality of engagement surfaces located on the turbine housing. The turbine housing resisting rotation while applying a rotational motion, relative to the longitudinal axis, to the cover can remove the releasable engagement of the cover and the turbine housing. The turbine housing resisting rotation while applying an opposite rotational motion, relative to the longitudinal axis, to the cover can install the releasable engagement of the cover and the turbine housing.

Figure 12:
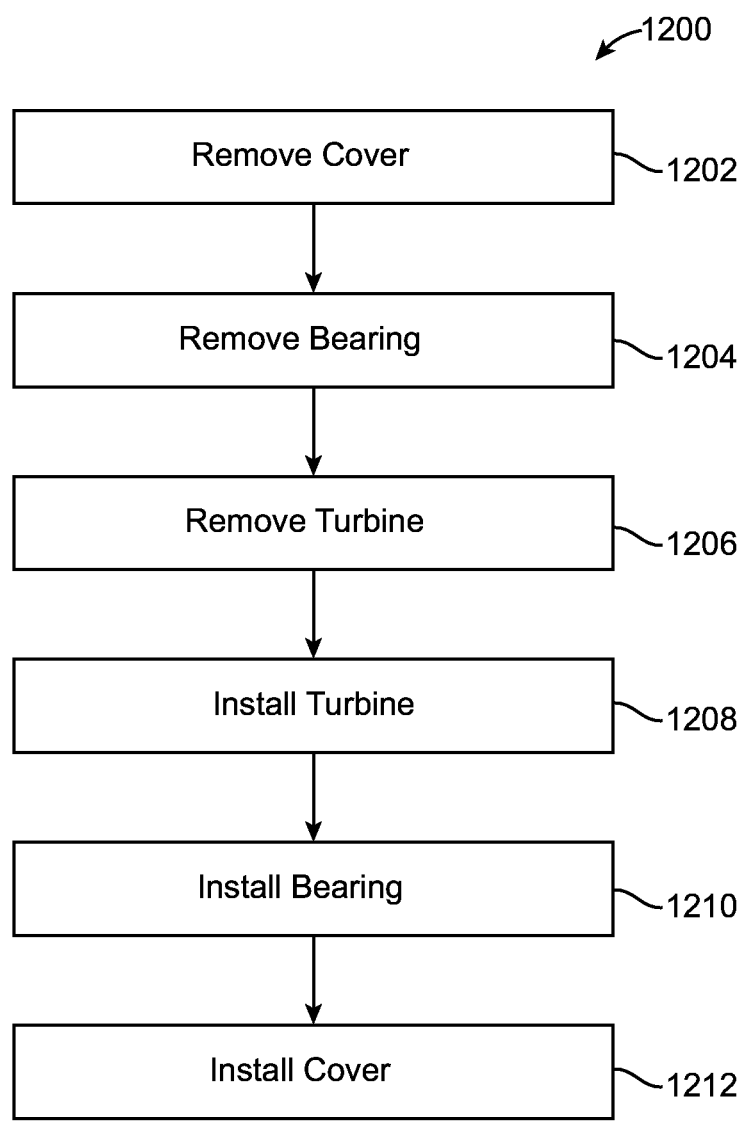
FIG. 12 is a flow chart of a method according to the present disclosure.

The present disclosure also includes a method 1200 as illustrated in FIG. 12. The method as presented is a method for servicing the power unit as presented herein. While the described method includes both dis-assembly and re-assembly, it can be appreciated that the assembly of the power unit can be as indicated above. In one embodiment, the power unit is shipped in an assembled or closed configuration, such that when it arrives it is ready for use. In other embodiments, the power unit can be shipped in various different components. As indicated above, the power unit is configured such that it can be dis-assembled and re-assembled by an operator of the power unit, for example a machinist. The ability to service the power unit by the machinist or designated field service coordinator saves time and expenses as the power unit can be repaired. For example, the power unit as described above can have one or more bearings. After use, the one or more bearings can fail or prevent the tool from maintaining the desired cutting characteristics. When the power unit falls outside of the desired tolerance, the operator or appropriate person can dis-assemble the power unit to repair it.

The method as illustrated includes one or more optional portions as well as the all of the portions are not illustrated.

As illustrated, the method can include removing a cover (block 1202). In one or more embodiments as presented herein, the power unit can include one or more covers. If a bearing fails, the cover that is closest to the bearing can be removed when more than one cover is provided. When a single cover is provided the single cover is removed to permit access to the inside of the turbine housing. For example, when the cover is threaded, the cover can be removed by un-screwing the cover from the housing.

The method can further include removing a bearing from the housing (block 1204). In one or more embodiments, the bearing can be constrained from movement. In other embodiments, the bearing can be removed once the cover has been removed. In other embodiments, a spacer or biasing member can be located between the bearing and the cover.

In at least one embodiment, the method can include removing the turbine (block 1206). In at least one embodiment, the turbine can be removed once the shaft that the turbine is coupled to is removed from the housing. For example, the turbine can be affixed to the shaft and require additional tools or equipment to remove the turbine from the shaft. In other embodiments, the turbine can be removed from the shaft while the shaft is still located within the housing.

The method can further include removing the additional components from the housing. The method can further include removing the other components from within the housing. In other embodiments in which two covers are provided on the power unit, the components can be removed from one or both openings after the respective cover is removed.

If the turbine needs replacing, the turbine can be installed on the shaft (block 1208). The installation of the turbine on the shaft has been described in detail above with respect to FIGS. 10A-10J.

If one or more of the bearings is to be replaced, the bearings can be installed within the housing (block 1210). The installation of the bearing can be through the opening in the housing that is closest to the location of the bearing being replaced. In at least one embodiment, the bearing can be installed on the shaft.

After the components are replaced, the one or more covers can be installed on the housing (block 1212). Once the one or more covers are installed, the power unit is again configured for operation.

One or more of the features as described above can be combined to form an embodiment. Specifically, the features described above can be formed together to create various embodiments of a turbine power unit. The turbine power unit for a cutting tool can include one or more of the following features: a turbine housing having an interior space configured to receive therein a fluid powered turbine supported for rotation on a bearing within the turbine housing; a service opening through the turbine housing into the interior space thereof, the service opening configured to permit installation and removal of the bearings into and out of the interior space of the turbine housing; and a removable cover releasably securable to the turbine housing over the service opening and transitionable between an open configuration in which a bearing can be installed into and removed from the interior space of the turbine housing through the service opening and a closed configuration in which an installed bearing within the interior space is secured for operation in the turbine housing.

At least one embodiment of the turbine unit further comprises a tool shank, wherein the turbine is coupled to the tool shank and the bearing supports the tool shank.

In at least one embodiment, the turbine is supported on the bearing and an additional bearing within the turbine housing, at least one of the bearings located proximate to the service opening and exposed through the service opening when the removable cover is in the open configuration.

At least one embodiment of the turbine unit further comprises an additional service opening through the turbine housing into the interior space thereof, each service openings configured to permit installation and removal of the bearing into and out of the interior space of the turbine housing.

At least one embodiment of the turbine unit further comprises an additional removable cover, each cover releasably securable to the turbine housing over a respective service opening.

At least one embodiment of the turbine unit further comprises an additional bearing, each bearing is located proximate to one of the service openings and exposed through the respective service opening when the respective removable cover is in the open configuration.

In at least one embodiment, each bearing is located proximate to one of the service openings and abuttingly engaged by a removable cover in a closed configuration.

At least one embodiment of the turbine unit further comprises a shaft retained in the bearings, the shaft having a shaft extension that extends through a shaft aperture in the removable cover.

In at least one embodiment, the turbine comprises a plurality of vanes.

In at least one embodiment, the turbine housing forms one or more apertures for receiving fluid or gas therethrough.

In at least one embodiment, the one or more apertures open into the inside of the turbine housing adjacent to the turbine, whereby the fluid or gas drives the turbine.

In at least one embodiment, the removable cover has a face surface which forms a plurality of through openings allowing for fluid or air to exit from the turbine housing when the removable cover is in the closed configuration.

In at least one embodiment, the removable cover has a sidewall which forms a plurality of through openings allowing for fluid or air to exit from the turbine housing when the removable cover is in the closed configuration.

In at least one embodiment, the removable cover includes a sidewall that has a plurality of engagement surfaces formed thereon.

In at least one embodiment, the plurality of engagement surfaces are substantially flat.

Additionally, one embodiment of the turbine unit further comprises an additional cover that is configured to be substantially flush with one end of the turbine housing in an installed configuration.

Additionally, one embodiment of the turbine unit further comprises an additional cover that has a plurality of depressions formed therein for receiving a coupling tool to install and remove the additional cover to the turbine housing.

In at least one embodiment, the additional cover has a shaft receiving portion formed on an interior of the additional cover, the shaft receiving portion configured to receive a portion of the shaft.

In at least one embodiment, the turbine is configured to be driven by one of an emulsion, air mist, external coolant, or external air mist, wherein the air mist is a mixture of oil and air.

The present disclosure also presents a method for assembling, dis-assembling, and/or servicing a turbine housing of a power unit. In one embodiment, a method of servicing a turbine housing comprises removing a cover coupled to a housing having an interior space configured to receive therein a fluid powered turbine supported for rotation on a bearing within the turbine housing and a service opening through the turbine housing into the interior space thereof, the service opening configured to permit installation and removal of the bearings into and out of the interior space of the turbine housing; removing the bearing; installing a replacement bearing within the turbine housing; and installing the removable cover.

In other embodiments, the method can further include steps as described above in servicing, assembling or dis-assembling the power unit.

The embodiments shown and described above are only examples. Many details are often found in the art such as the other features of a turbine driven shafts. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A turbine power unit for a cutting tool, the power unit comprising:
a turbine housing having an interior space configured to receive therein a fluid powered turbine supported for rotation on a bearing disposed within the turbine housing;
a tool shank comprising an elongated portion and an end portion, wherein the turbine is directly coupled to the tool shank at the elongated portion, wherein the bearing is in direct contact with the elongated portion of the tool shank, and wherein the end portion of the tool shank forms a cutting tip;
a service opening through the turbine housing into the interior space thereof, the service opening configured to permit installation and removal of the bearing, turbine, and cutting tool into and out of the interior space of the turbine housing; and
a removable cover releasably securable to the turbine housing and disposed over the service opening and transitionable between an open configuration in which the bearing turbine, and cutting tool can be installed into and removed from the interior space of the turbine housing through the service opening and a closed configuration in which the bearing disposed within the interior space is secured for operation within the turbine housing.

2. The power unit as recited in claim 1, wherein the turbine is supported on the bearing at a first end of the turbine and an additional bearing at a second end of the turbine, the second end disposed opposite the first end.

3. The power unit as recited in claim 2, further comprising an additional service opening through the turbine housing into the interior space thereof, wherein the additional service opening is configured to permit installation and removal of the bearings and/or tool and turbine assembly into and out of the interior space of the turbine housing.

4. The power unit as recited in claim 3, further comprising an additional removable cover, each removable cover releasably securable to the turbine housing over a respective service opening.

5. The power unit as recited in claim 4, wherein each bearing is located proximate to one of the service openings.

6. The power unit as recited in claim 2, wherein the end portion of the tool shank extends through an aperture in the removable cover.

7. The power unit as recited in claim 1, wherein the turbine comprises a plurality of vanes.

8. The power unit as recited in claim 1, wherein the turbine housing forms one or more apertures for receiving fluid therethrough.

9. The power unit as recited in claim 8, wherein the one or more apertures open into the inside of the turbine housing adjacent to the turbine, whereby the fluid drives the turbine.

10. The power unit as recited in claim 1, wherein the removable cover has a face surface which forms a plurality of through openings allowing for fluid to exit from the turbine housing when the removable cover is in the closed configuration.

11. The power unit as recited in claim 1, wherein the removable cover has a sidewall which forms a plurality of through openings allowing for fluid to exit from the turbine housing when the removable cover is in the closed configuration.

12. The power unit as recited in claim 1, wherein the removable cover includes a sidewall that has a plurality of engagement surfaces formed thereon.

13. The power unit as recited in claim 12, wherein the plurality of engagement surfaces are substantially flat.

14. The power unit as recited in claim 1, further comprising an additional cover that is configured to be substantially flush with one end of the turbine housing in an installed configuration.

15. The power unit as recited in claim 1, further comprising an additional cover that has a plurality of depressions formed therein for receiving a coupling tool to install and remove the additional cover to the turbine housing.

16. The power unit as recited in claim 15, wherein the additional cover has a shaft receiving portion formed on an interior of the additional cover, the shaft receiving portion configured to receive a portion of the shaft.

17. The power unit as recited in claim 1, wherein the turbine is configured to be driven by at least one of an emulsion, air mist, oil, and mixture of oil and air.

18. A method of servicing a turbine housing, the method comprising:
removing a cover coupled to a housing having an interior space configured to receive therein a fluid powered turbine supported for rotation on a bearing within the turbine housing and a service opening through the turbine housing into the interior space thereof, the service opening configured to permit installation and removal of the bearing into and out of the interior space of the turbine housing;

removing the bearing, wherein each of the bearing and turbine are directly coupled to an elongated portion of a tool shank, the tool shank further comprising an end portion forming a cutting tip;

installing a replacement bearing within the turbine housing; and installing the removable cover.

19. A cutting power tool comprising:

a housing comprising a cylindrical body having an opening at a first end, the housing further comprising an aperture for receiving fluid therethrough and a plurality of channels formed within a sidewall of the housing, the plurality of channels extending longitudinally along the sidewall toward the first end of the turbine housing, the plurality of channels configured to direct the fluid toward the first end of the turbine housing;

a turbine disposed on a cutting tool and within the housing, the turbine configured to rotate the tool when driven by the fluid received through the aperture;

a bearing set disposed on the cutting tool and within the housing, the bearing set disposed proximal to the first end of the housing;

a cover releasably coupled to the first end of the housing, wherein the cover comprises a plurality of openings disposed adjacent to the plurality of channels and in fluid communication with the plurality of channels, the plurality of openings configured to exhaust the fluid from the plurality of channels.

20. The cutting power tool of claim 19, further comprising an O-Ring set between the front cover and front bearing for preloading the bearings for better dynamic and static run-out of the cutting tool bit.

* * * * *